United States Patent [19]

Lee, Jr.

[11] Patent Number: 5,397,822
[45] Date of Patent: Mar. 14, 1995

[54] THERMOPLASTIC COMPOSITIONS CONTAINING POLYPHENYLENE ETHER RESIN AND CHARACTERIZED BY IMPROVED ELONGATION AND FLEXIBILITY EMPLOYING A BLEND OF MULTIBLOCK COPOLYMERS

[75] Inventor: Gim F. Lee, Jr., Albany, N.Y.

[73] Assignee: General Electric Company, Pittsfield, Mass.

[21] Appl. No.: 108,966

[22] Filed: Aug. 18, 1993

[51] Int. Cl.$^6$ .................. C08K 3/32; C08L 71/12; C08L 83/04

[52] U.S. Cl. .................. 524/127; 524/128; 524/267; 524/505; 524/508; 525/89; 525/92; 174/110 AR; 174/110 SR

[58] Field of Search .................. 525/89, 92; 524/127, 524/128, 267, 505, 508; 174/110 AR, 110 SR

[56] References Cited

U.S. PATENT DOCUMENTS

| | | | |
|---|---|---|---|
| 3,737,479 | 6/1973 | Haaf | 260/824 |
| 4,113,800 | 9/1978 | Lee, Jr. | 525/89 |
| 4,242,263 | 12/1980 | Lee, Jr. | 525/89 |
| 4,277,575 | 7/1981 | Haaf et al. | 525/89 |
| 4,383,082 | 5/1983 | Lee, Jr. | 525/92 |
| 4,446,090 | 5/1984 | Lovren et al. | 264/211 |
| 4,808,647 | 2/1989 | Abolins et al. | 524/141 |
| 4,874,810 | 10/1989 | Lee, Jr. et al. | 525/92 |
| 4,879,330 | 11/1989 | De Munck et al. | 525/92 |
| 4,945,018 | 7/1990 | Abolins et al. | 524/141 |
| 5,104,937 | 4/1992 | Saito et al. | 525/396 |
| 5,134,196 | 7/1992 | van der Meer | 525/92 |
| 5,166,264 | 12/1992 | Lee, Jr. et al. | 525/92 |
| 5,169,887 | 12/1992 | Snow et al. | 524/265 |

OTHER PUBLICATIONS

"Antioxidants" Modern Plastics Encyclopedia. vol. 60, No. 10A. Oct. 1983. p. 102.

*Primary Examiner*—James J. Seidleck
*Assistant Examiner*—Thomas Hamilton, III

[57] ABSTRACT

A thermoplastic resin composition having in admixture a polyphenylene ether resin and an elastomeric block copolymer wherein the block copolymer has in admixture a triblock copolymer A-B-A' and a diblock copolymer A-B with A and A' being polymerized vinyl aromatic hydrocarbon blocks such as styrene and B being an ethylene-alkylene block such as ethylene-butylene. The composition of this invention can also include other additives such as siloxane fluids, flame retardants, polyolefins, and phosphates, as well as fillers, etc. Also included in this invention is the process of preparing such compositions and articles of manufacture prepared therefrom, such as electrical conductor articles or formed articles. The compositions of this invention provide improved flexibility and elongation.

23 Claims, No Drawings

THERMOPLASTIC COMPOSITIONS CONTAINING POLYPHENYLENE ETHER RESIN AND CHARACTERIZED BY IMPROVED ELONGATION AND FLEXIBILITY EMPLOYING A BLEND OF MULTIBLOCK COPOLYMERS

FIELD OF THE INVENTION

This invention generally relates to thermoplastic compositions containing polyphenylene ether resin and elastomeric multiblock copolymers, and more particularly, to a blend of multiblock polymers, and to articles made therefrom.

Polyphenylene ether resin (also known and hereinafter referred to as "PPE") has become widely accepted in the plastics industry because of its desirable physical and chemical properties, such as high heat resistance and dimensional stability. PPE by itself is dielectric and also somewhat flame-retarding. Such benefits promote its use in certain products, for example, as an insulating material for electrical wire.

PPE-based compositions for these insulating applications sometimes include polyolefins, and exhibit improved impact strength and chemical resistance. Reference is therefore made here to U.S. patent application Ser. No. 07/372,218, filed Jun. 23, 1989, U.S. Pat. No. 5,166,264 (G. Lee, Jr., and J. Yates III), and U.S. patent application Ser. No. 07/395,831, filed Aug. 18, 1989, now abandoned. (G. Lee, Jr.), both of which are assigned to the assignee of the present application.

However, the inclusion of olefinic components can decrease the flame retardance of the overall composition, thereby necessitating the addition of special additives to regain this important property. As an illustration, U.S. Pat. No. 4,808,647 (V. Abolins et.al.) describes the use of a multi-component flame retardant composition which includes an organic phosphate and a brominated material such as a tetrabromobisphenol-A oligomeric polycarbonate.

While the compositions described in the Abolins patent exhibit excellent properties suitable for many applications, it is often desirable to minimize or eliminate the use of bromine or other halogen-containing additives in compositions designed for certain products. For example, the wire insulation compositions mentioned above frequently cannot contain halogen additives because they could form corrosive compounds when exposed to high temperatures, thereby resulting in considerable damage to surrounding electrical equipment. Nevertheless, any modification of such an insulation composition must not result in significant decreases in the other important properties necessary for very durable products, e.g. flexibility and "stretchability" (elongation).

In co-pending U.S. patent applications Ser. No. 07/883446 filed May 15, 1992 and application Ser. No. 07/996,356 filed Dec. 23, 1992 both by G. Lee, Jr., there are disclosed combinations of PPE resins with certain elastomeric multiblock copolymers and other additives such as siloxane fluids, polyolefins, flame retardants, stabilizers, fillers and reinforcing agents. These compositions as reported therein have improved flexibility and elongation.

It is therefore apparent that a need still exists for polyphenylene ether-based compositions that provide even further improved flexibility, elongation and non-corrosive properties, as well as having flame retardant properties. In particular, a need exists for wire insulation compositions which are flame retardant, and which exhibit improved tensile elongation and improved flexibility over current wire coating compositions, while being halogen-free with respect to the flame retardant additive.

SUMMARY OF THE INVENTION

The requirements described above have been satisfied by the discovery of the present invention, one embodiment of which is a thermoplastic composition comprising polyphenylene ether resin and from about 10% by weight to about 50% by weight of a blend of elastomeric block copolymers wherein the blend comprises an elastomeric block copolymer having a hydrogenated A-B-A' structure and an elastomeric block copolymer having a hydrogenated A-B structure. The A-B-A' elastomeric block copolymer is a triblock copolymer wherein A and A' are polymerized vinyl aromatic hydrocarbon blocks, and B is an ethylene-alkylene block. The A-B elastomer block copolymer is a diblock copolymer wherein A is a polymerized vinyl aromatic hydrocarbon block and B is an ethylene-alkylene block. The amount of the triblock and diblock copolymer employed herein can range from about 75 weight percent to about 25 weight percent of the triblock component of the blend and correspondingly about 25 weight percent to about 75 weight percent of the diblock component, said weight percent being based on the weight of the total blend of elastomeric block copolymers. The weight percentages for the for the composition of PPE and elastomeric block copolymers are based on the total weight of the composition of PPE and block copolymers. As further described below, the molecular weight of the blocks of the copolymers is preferably within certain ranges.

As also described below, the particular combination of PPE resin with these specific elastomeric block copolymer blends, i.e. blends of triblock and diblock, has surprisingly resulted in compositions which exhibit important properties which are dramatically superior to those in PPE compositions which contain only a triblock elastomeric copolymer.

Another embodiment of the present invention is an improved electrical conductor article which includes a very durable and flexible coating material formed from PPE resin and the blend of elastomeric block copolymers described herein. The coating material may be applied over the surface of the conductor, or may be used as a jacket layer applied over another wire insulating material.

Yet another embodiment of the present invention is an improved molded article having improved flexibility and improved elongation, as well as flame retardancy, particularly where such properties are wanted for molded articles.

DETAILED DESCRIPTION OF THE INVENTION

Polyphenylene ether (PPE) is a well known class of synthetic polymeric resins as are methods of their preparation. Representative of polyphenylene ethers are those which comprise a plurality of recurring chain structural units having the formula:

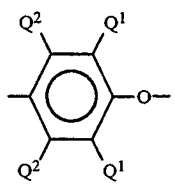 (I)

wherein each $Q^1$ is independently halogen, primary or secondary lower alkyl, phenyl, haloalkyl, aminoalkyl, hydrocarbonoxy, or halohydrocarbonoxy wherein at leash two carbon atoms separate the halogen and oxygen atoms; and each $Q^2$ is independently hydrogen, halogen, primary or secondary lower alkyl, phenyl, halalkyl, hydrocarbonoxy or halohydrocarbonoxy as defined for $Q^1$.

The term "halogen" as used herein means chlorine, bromine, fluorine, or iodine.

Examples of primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylbutyl, n-hexyl, 2,3-dimethyl-butyl, 2-, 3-, 4-methylpentyl, and the corresponding heptyl groups. Examples of secondary lower alkyl groups are isopropyl, sec-butyl and 3-pentyl. Preferably, any alkyl radicals are straight chain, rather than branched. Most often, each $Q^1$ is alkyl or phenyl, especially $C_{1-4}$ alkyl, and each $Q^2$ is hydrogen.

Both homopolymer and copolymer polyphenylene ethers are included. Representative homopolymers are those containing, for example, 2,6-dimethyl-1, 4-phenylene ether units. Representative copolymes include random copolymers containing such units in combination with (for example) 2,3,6-trimethyl-1, 4-phenylene ether units. Many suitable random copolymers, as well as homopolymers, are disclosed in the patent literature, see for example Hay, U.S. Pat. Nos. 3,306,874; 3,306,875 and 3,432,469, Geln Staaloff, U.S. Pat. Nos. 3,257,357 and 3,257,358; Van Dort, U.S. Pat. No. 3,365,422, Bennett and Cooper, U.S. Pat. Nos. 3,639,656, 3,642,699, 3,733,299, 3,838,102, 3,661,848, and 4,092,294; Olander, U.S. Pat. No. 4,083,838; White et. al. U.S. Pat. No. 4,806,602; and Brown et. al. U.S. Pat. No. 4,806,297. All of these patents are incorporated herein by reference.

Also included for use in the compositions of the invention are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and like polymers. The product may contain both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles, and formals.

The polyphenylene ether advantageously has a number average molecular weight ($M_n$) within the range of about 3,000–40,000 and a weight average molecular weight ($M_w$) within the range of about 20,000–80,000, as determined by gel permeation chromatography. Their intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly (2,6-dime-thyl-1, 4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266, and 4,028,341, all of which are incorporated herein by reference. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, W-hydroxyoximes (monomeric and polymeric), o-hydroxyaryl oximes and B-diketones. Also useful are known cobalt-containing catalyst systems. Suitable manganese and cobalt-containing catalyst systems for polyphenylene ether preparation are well known in the art.

As another example, coupled PPE polymers may also be used in which the coupling agent is reacted with the hydroxy groups of two PPE chains to produce a higher molecular weight polymer.

It will be apparent to those skilled in the art from the foregoing that the polyphenylene ethers contemplated for use in the compositions of the present invention include all those presently known, irrespective of variations in structural units or ancillary chemical features.

In some embodiments, a polystyrene homopolymer or random copolymer resin may be included in the composition. These materials, which are very compatible with the PPE polymer, are known in the art and described, for example, in U.S. Pat. Nos. 3,383,435; 4,189,411; and 4,242,363, all incorporated herein by reference. Illustrative resins of this type are polystyrene, poly-alpha-methyl styrene, poly-paramethyl styrene, polychlorostyrene, brominated polymers (e.g., those formed from dibromostyrene monomer), as well as styrene polymers modified by admixture or interpolymerization with natural or synthetic elastomeric materials, e.g., polybutadiene, polyisoprene, butyl rubber, EPDM rubber, and the like. Also contemplated are styrene-acrylonitrile copolymers (SAN), acrylate-styrene-acrylonitrile terpolymers (ASA), and styrene-acrylonitrile-butadiene terpolymers (ABS). Special mention is made of rubber-modified styrene polymers ("high impact polystyrene"), which are frequently used in conjunction with PPE to enhance processing and impact strength. These high impact polystyrenes are generally prepared by the copolymerization of polybutadiene and a styrene monomer.

The amount of styrene resin, when present (i.e., the amount of homopolymer, copolymer, or mixture as described above), is usually about 1% by weight to about 50% by weight, and preferably, about 2% by weight to about 30% by weight, based on the weight of the entire composition.

As stated previously, the elastomeric copolymer component of the present invention is a blend of an A-B-A' block copolymer (triblock) and an A-B block copolymer (diblock). In the A-B-A' triblock copolymer structure of this invention, the A and A' are polymerized vinyl aromatic hydrocarbon blocks, and B is an ethylene-alkylene block derived from at least one polymerized conjugated diene. In preferred embodiments, the block copolymers preferably contain between about 15% and 50% by weight of vinyl aromatics. The A and A' block each have an average molecular weight, preferably number average molecular weight, in the range of about 3,000 to about 20,000, and preferably about 5,000 to about 15,000.

In preferred embodiments of this invention, A and A' are polymers independently derived from the group of monomers consisting of styrene, alphamethyl styrene, para-methyl styrene, vinyl toluene, vinyl xylene, vinyl naphthalene, chlorostyrene, bromostyrene, dibromostyrene, and combinations thereof. Styrene monomer is the preferred monomer.

Center block B of the block copolymer A-B-A' should be almost completely hydrogenated, i.e., the average unsaturation of the copolymer should be reduced to less than about 20% of its original value. In more preferred embodiments, the average unsaturation will be reduced to less than about 10%, and most preferably, less than about 5% of its original value. Methods for accomplishing the hydrogenation of the B block are known in the art.

The B block component of the triblock copolymer of this invention is an ethylene-alkylene component and may be either linear or branched block component. The B block component is preferably derived from a diene monomer or a hydrogenated diene monomer. Examples of such ethylene-alkylene block components are ethylene-propylene, ethylene-butylene, ethylene-hexene, ethylene-pentene, etc. Preferably, the center block B is derived from at least one conjugated diene such as 1,3-butadiene. In the most preferred embodiments, B is obtained via post-hydrogenation of polybutadiene. The average molecular weight, preferably number average molecular weight, of the B block should be in the range of about 25,000 to about 150,000, and most preferably, in the range of about 30,000 to about 100,000.

An especially preferred elastomeric triblock copolymer of this invention comprises blocks of styrene and post-hydrogenated polybutadiene within the above-prescribed molecular weight ranges, and is often referred to as "SEBS". Commercial examples of a suitable material are the linear KRATON ® G-1650 or 1652 thermoplastic rubbers, available from Shell Chemical Company.

The other part of the blend of elastomeric block copolymers of the invention is an elastomeric diblock copolymer having the structure A-B wherein A is a polymerized vinyl aromatic hydrocarbon block having an average molecular weight, preferably number average molecular weight, of about 3,000 to about 45,000, and preferably about 5000 to about 35,000. The B block component of the elastomeric diblock copolymer is an ethylene-alkylene copolymer having an average molecular weight, preferably number average molecular weight, of about 25,000 to about 150,000, and preferably about 30,000 to about 100,000. The alkylene portion of the ethylene-alkylene component of the diblock is either linear or branched block component and is preferably derived from a diene monomer or a hydrogenated diene monomer. Examples of such diblock copolymers are ethylene-propylene, ethylene-butylene, ethylene-hexene, ethylene-pentene, etc.

The elastomeric block copolymer blend of this invention comprises in admixture from about 75 to about 25 weight percent of the triblock component of the blend, and preferably about 70 to about 30 weight percent thereof. The diblock elastomeric component of the blend comprises, correspondingly, about 25 to about 75 weight percent of the diblock component of the blend, and preferably about 30 weight percent to about 70 weight percent thereof.

The level of the elastomeric block copolymer blend present in the composition of this invention depends on a variety of factors, such as the particular type of PPE resin used, the contemplated end use of the product, the level of tensile elongation required in such a product, and the presence or absence of other additives in the composition. In preferred embodiments, the composition of this invention comprises in admixture the polyphenylene ether resin and the elastomeric block copolymer blend which is present at a level in the range of about 10% by weight to about 50% by weight, based on the weight of the total weight of PPE and elastomeric blend composition. In more preferred embodiments, the level is about 15% by weight to about 40% by weight, while in most preferred embodiments, the level is about 20% by weight to about 30% by weight, again based on the total weight of PPE and elastomeric blend composition.

The preparation of elastomeric block copolymers, i.e., the triblock or diblock copolymers, of the type used in the present invention is known in the art. For example, one technique involves the successive polymerization of the monomers in solution in the presence of a monolithium hydrocarbon initiator. Further aspects of the preparation of these polymers can be found in European Pat. No. 95,098; in U.S. Pat. Nos. 3,113,986; 3,431,323; 3,700,633; and 4,167,507, in the U.S. patent application of Christian Bailly and William R. Haaf, Ser. No. 407,600, filed Sep. 15, 1989; in German Public Disclosure 1;222,260; and in German Letters of Disclosure 2,013,263, the contents of all of these references being incorporated herein by reference.

Further, within the scope of this invention, polyorganosiloxanes can also be employed herein. Polyorganosiloxanes are a well known class of synthetic polymers which may be prepared by methods such as, for example, those described in the U.S. Pat. Nos. 2,469,888; 2,469,890; and 3,737,479, all of which are incorporated herein by reference thereto. The polyorganosiloxanes employed as ingredients in the compositions of the present invention are commonly referred to as "phenylsiloxane fluids".

The phenylsiloxane fluids can have a weight average molecular weight ($M_w$) of up to 100,000 and preferably 800 to 5,000. These fluids can be blended with polyphenylene ether to make the blends of the present invention. These phenylsiloxanes are well known materials and are shown in the Encyclopedia of Polymer Science and Engineering, Vol. 15, pages 258-264, John Wylie and Sons, New York (1989). For example, the phenylsiloxane fluids of the present invention can be made by initially equilibrating dimethyl silicone stock (hydrolysate or distilled cyclic compounds) and a source of chain terminator, such as a trimethylsiloxy unit. Siloxy units having phenyl substituents can be introduced as diphenylsiloxane or methylphenylsiloxane. In most instances, the equilibrated fluid is devolatilized by heat and vacuum after catalyst deactivation. Phenyl substitution, for example, methylphenylsiloxy units which are equilibrated into the dimethylsiloxane backbone, has been found to increase the thermal and oxidafire stability of the resulting polydiorganosiloxane. Copolymers of dimethylsiloxane with some methylphenylsiloxane have been found to have lower pour points because the bulky groups interfere with crystallization of the methyl polymer.

In general then, the phenylsiloxane fluids employed as ingredients in the compositions of the invention comprise those of the formula:

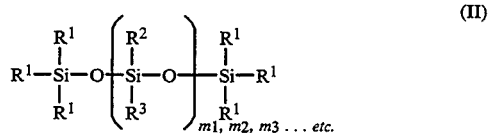
(II)

wherein each $R^1$ is alkyl, haloalkyl, aryl, aralkyl, alkaryl, alkoxy, aryloxy, and halogenated derivatives of the aforesaid aryl, aralkyl, alkaryl, alkoxy, or aryloxy groups, each $R^2$ and $R^3$ are methyl, phenyl, or phenylethyl, and $m_1, m_2, m_3 \ldots$ etc. are integers for various combinations of $R^2$ and $R^3$ such that the polysiloxane is a fluid at room temperature, and preferably wherein they are chemically combined units of the formulae:

$(C_6H_5)_2SiO$ (a)

$CH_3(C_6H_5)SiO$ and (b)

$(CH_3)_2SiO$ (c)

where there is present in the phenylsiloxane fluid from 20 to 40 mole percentage of (a), or 40 to 80 mole percentage of (b), and 21 to 79 mole percentage of the sum of (a)+(b), based on the total moles of (a), (b), and (c).

Some embodiments of the present invention include a polyolefin resin, such as those described in the above-mentioned application Ser. No. 372,218 now U.S. Pat No. 5,166,264 of Gim Lee and John Yates, incorporated herein by reference. Examples of suitable polyolefins are polyethylene, polypropylene, polyisobutylene, copolymers of ethylene and propylene, copolymers of ethylene and organic esters such as ethylene vinyl acetate, ethylene ethyl acrylate, ethylene methyl acrylate, and the like, as well as mixtures of any polyolefins. The materials themselves are known in the art, as are methods for making them.

Preferred polyolefins are polyethylene, polypropylene, and polybutylene. Especially preferred are low density polyethylene (LDPE), very low density polyethylene, linear low density polyethylene (LLDPE), medium density polyethylene (MDPE), high density polyethylene (HDPE), high impact (copolymer) polypropylene, or combinations of any of the above.

A suitable level of polyolefin is about 1% by weight to about 30% by weight, based on the weight of the entire composition. A preferred level is about 1% by weight to about 20% by weight, and a most preferred level is about 1% by weight to about 15% by weight.

Some embodiments of the present invention include a plasticizer. Examples of such plasticizers are phosphate compounds; mineral oil; phthalate-, adipate-, and sebacate esters; polyols such as ethylene glycol, and the like, as well as mixtures of any of these materials. Arylphosphates, alkylated arylphosphates, and mixtures of any of these phosphates are often preferred; many of them can also provide a degree of flame retardancy to the composition.

Examples of suitable organic phosphates include phenyl bisdodecyl phosphate, ethyldiphenyl phosphate, tri-(nonylphenyl)phosphate, tricresyl phosphate, triphenyl phosphate, alkylated derivatives of triphenyl phosphate, dibutylphenyl phosphate, 2-ethylhexyldiphenyl phosphate, as well as mixtures of any of these materials. Also possible and sometimes preferred for use are di and poly phosphate compounds, such as those described in U.K. Patent Application GB 2,043,083A of William Haaf et al, and in U.S. patent application Ser. No. 07/552,356, filed Jul. 11, 1990 as a continuation application of Ser. No. 429,165, filed Oct. 30, 1989 now abandoned for V. Abolins, J. Betts, and F. Holub, the contents of which are incorporated herein by reference. Examples of these materials are his diphenyl phosphates of resorcinol or hydroquinone, as well as mixtures which comprise such phosphates. Other suitable phosphates are taught in U.S. Pat. No. 4,900,769 of V. Abolins et al, incorporated herein by reference. Triarylphosphates in admixture with alkylated aryl phosphates are often preferred. However, a most preferred phosphate is resorcinol diphosphate.

Those of ordinary skill in the art can determine the appropriate level of plasticizer without undue experimentation, which plasticizers in appropriate amounts can also function as a flame retardant. Usually, the plasticizer or flame retardant is present in an amount sufficient to either plasticize the composition or to flame retard the composition, as the case may be. However, it can be employed for the dual purpose thereof. Preferably, it is present at a level of from about 1% to about 25% by weight, based on the weight of the entire composition, and more preferred at a level is the range of about 5% by weight to about 15% by weight.

Some embodiments of this invention also include one or more phosphite compounds, which often increase the tensile elongation of materials made from these compositions, as well as acting as stabilizers for the present invention.

The phosphite compound used in the present invention can be of various types, such as alkyl phosphites, aryl phosphites, alkyl-aryl phosphites, diphosphites, polyphosphites, and thiophosphites. Many are disclosed in U.S. Pat. Nos. 4,659,760 and 4,472,546, incorporated herein by reference. Examples of suitable phosphites are triphenyl phosphite, diphenyl phosphite, trimesityl phosphite, dimesityl-phenyl phosphite, trineopentyl phosphite, didecylphenyl phosphite, dichloroethyl phosphite, tributyl phosphite, trilauryl phosphite, tris(-nonylphenyl) phosphite, tridecyl phosphite, diphenyldecyl phosphite, tricresyl phosphite, triisooctyl phosphite, tri-2-ethylhexyl phosphite, trioctadecyl phosphite, thiophosphite, phenyldiethyl phosphite, phenyl-di-(2-ethylhexyl) phosphite, isooctyldiphenyl phosphite, diisooctylmonophenyl phosphite, distearyl pentaerythritol diphosphite, bis(2,4-di-t-butylphenyl) pentaerythritol diphosphite (commercially available as ULTRANOX® 626 or ULTRANOX® 624), diphenyl isooctyl phosphite, diisooctyl phosphite, distearyl phosphite, diphenylisodecyl phosphite, diisodecyl pentaerythritol diphosphite, poly(dipropylene glycol) phenyl phosphite, and trilauryl trithiophosphite, as well as mixtures of the above.

An effective amount of the phosphite compound is usually in the range of about 0.01% by weight to about 10% by weight, based on the weight of the entire composition, with 0.1% by weight to about 1% by weight being most preferred. The most appropriate range can be determined according to various factors, such as the contemplated end use for the product, as well as the particular identity of the other components present.

Various other additives may be included in the compositions of this invention, their utility being, of course, dependent in part on the contemplated end use for the compositions. Non-limiting examples of these additives include reinforcing agents or fillers such as fibrous glass, graphite whiskers, titanium dioxide, silica, glass fiber, silicon carbide whiskers, carbon fibers, clay, talc, mica and the calcium carbonate; antioxidants; mold release agents; pigments; dyes; heat stabilizers; light stabilizers; processing stabilizers; abrasion resistance compounds; and the like, as well as additional flame retardants and/or plasticizers. These additives are usually included in effective amounts of between about 1% and 50% by weight of the total composition.

The compositions of the invention may be prepared by conventional blending techniques such as by melt-blending the ingredients. In a preferred process, some of the ingredients are combined separately as pre-mix blends and then melt blended and extruded from a single or twin screw extruder. For example, blends of polyphenylene ether and the phenylsiloxane fluids can be made by roller mixing or stirring the ingredients and thereafter melt extruding the pre-blend with the elastomer and any remaining, optional ingredients to obtain a processable blend. Compression molding of the ingredients also can be used.

In another preferred process, the ingredients, including optional ingredients, are first preblended together. The preblended composition is then melt extruded from a single or twin screw extruder. The extrudate may then be cooled (water quench for example) and then pelletized.

Another embodiment of this invention includes an improved electrical conductor article, having a coating material comprising the components described above. For example, an electrical conductor composition comprising in admixture (1) about 90% to about 50% by weight, preferably about 85% to about 70% by weight of a polyphenylene ether resin, (2) about 10% to about 50% by weight, preferably about 15% to about 30% by weight, of an elastomeric block copolymer comprising a blend of about 65% by weight of a styrene-(ethylene-butylene)-styrene triblock copolymer and, correspondingly, 35% by weight of a styrene-(ethylene-butylene) diblock copolymer, wherein the percent by weight of the polyphenylene ether resin and elastomeric block copolymer blend is based on the total weight of PPE resin and elastomer copolymer blend, (3) from about 1% by weight to about 25% by weight of a flame retardant, (4) from about 0.01% by weight to about 10% by weight of a phosphite, and (5) from about 1% by weight to about 30% by weight of a polyolefin. More particularly, in the above electrical composition, the flame retardant is resorcinol diphosphate; the phosphite is bis(2,4-di-5-butyl-phenyl) pentaerythritol diphosphite; and the polyolefin is a linear low density polyethylene (LLDPE). Unless otherwise stated, all percent by weights are based on the total weight of the composition.

The coating composition is applied over the surface of an electrical conductor, for example, copper or aluminum wire or cable. (Sometimes, the conductor is first coated with another material, e.g., a material which inhibits or prevents oxidation). Known methods of application are suitable, such as extrusion, followed by cooling. The coating thus forms an excellent electric-insulator for the metal. If desirable, one or more outer or "jacket" layers may be formed over the coating. These layers are also often formed of a polymeric material, such as polyvinyl chloride, a polyester like polybutylene terephthalate, or a polyamide, and can also be applied by extrusion techniques, such as tandem extrusion.

Alternatively, the coating composition of this invention may be used itself as a jacket layer applied over a wire insulating material such as polyvinyl chloride.

Furthermore, the improved compositions described herein are not limited for use as a coating material. They may be used to form any type of formed (e.g., molded, calendered, or extruded) article where excellent tensile elongation and/or flame retardance are desirable, as well as flexibility.

The following examples are provided to illustrate various embodiments of this invention. They are for the purpose of illustration only, and should not be regarded as limiting the invention to any of the specific materials or conditions described therein.

EXAMPLES 1–11

The materials employed in the Examples as component parts were as follows:

Polyphenylene ether (PPE)—Poly(2,6-dimethyl-1,4-phenylene) ether, having an intrinsic viscosity of 0.46 deciliters per gram (dl/g), as measured in chloroform at 25° C.

KRATON® G- 1652 ,(KG-16521)—Linear styrene-(ethylene-butylene)-styrene triblock rubber copolymer, available from Shell Chemical Company, having a total average molecular weight of about 50,400, with each styrene block having an average molecular weight of about 7,700, and the ethylene-butylene block having an average molecular weight of about 35,000.

KRATON® G- 1657 (KG-1657)—Mixture of linear styrene-(ethylene-butylene)-styrene triblock copolymer and a styrene-(ethylene-butylene) diblock copolymer in the ratio of 65/35, with the ratio of total polystyrene to total rubber being 14/86, wherein each styrene block is about 5,000 average molecular weight, and each ethylene-butylene block is about 70,000 average molecular weight.

KRATON® G- 1726 (KG-1726)—Same as KRATON® G-1657, except that the mixture is a 30/70 ratio of triblock to diblock and the total polystyrene to total rubber ratio is 29/71. Each styrene block is about 7,700 average molecular weight and rubber block is about 30,000 average molecular weight.

Plasticizer (71-B) - Mixture of tri(aryl) phosphate and alkylated derivatives thereof as described in U.S. Pat. No. 4,945,018.

Plasticizer (RDP)—Resorcinol diphosphate.

Polyolefin PE (GR-8320)—A 20 melt index polyethylene resin.

Siloxane Fluid (SF-1265) - A silicone (polyphenylsiloxane linear fluid; General Electric Company) comprised of a combination of diphenyl and dimethyl siloxane units in a molar ratio of circa 40:60. The fluid typically has a 400 to 600 centistoke viscosity, a $M_w$ of about 1,600, a $M_n$ of about 400 and trimethylsiloxy termination.

Phosphite (ULTRANOX U-261) bis(2,4-di-t-butylphenyl) pentaerythritol diphosphite (GE Specialty Chemicals, Inc.).

Where reported, the following physical test procedures were carried out:

Tensile Properties: The tensile elongation tests were run at 20 inches per minute on test parts cut from extruded film.

In each Example, as reported in the table below, the component parts were first dry blended for about 30 seconds in a laboratory blender. Each blend was separately extruded in a Werner-Pfleiderer 30 mm twin screw extruder. The melt-blended extrudate of each Example was quenched in water at room temperature and then pelletized.

The pellets of each Example so prepared were then extruded through a die orifice at various temperatures, as set forth in the below table, into a thin films of 10 mils in thickness. The films extruded at the various temperatures for each Example were then cut into test specimens having a "dog bone" configuration of about 5 inches long for testing for tensile yield (TY), tensile strength (TS) and tensile elongation (TE), employing an Instron Tensile Tester.

The results, along with the formulation for each Example, and extrusion temperatures are as set forth in the following table.

copolymer. Please note Examples 2, 4, 6, 8, 9, 10, and 11 compared against comparison Examples 1, 3, 5, and 7. In each case, improved flexibility was obtained with the compositions of this invention, as demonstrated by tensile strength (TS) and tensile elongation (TE) values.

Also, when using resorcinol diphosphate (RDP) in place of the 71B, good results were still obtained. The use of RDP significantly reduces fuming and odor when used in place of 71B as a flame retardant.

While variations of this invention will be suggested to those skilled in the ark, in view of the above disclosures, any such variations are intended to be within the scope of the claims appended hereto.

What is claimed is:

1. A flexible thermoplastic resin composition comprising in admixture a polyphenylene ether resin, from 10% by weight to 50% by weight of an elastomeric block copolymer based on the total weight of polyphenylene ether resin and elastomeric block copolymer wherein the elastomeric block copolymer comprises in admixture from 75% by weight to 25% by weight of a triblock copolymer having a hydrogenated structure of A-B-A' and correspondingly from 25% by weight to 75% by weight of a diblock copolymer having a hydrogenated structure of A-B, wherein A and A' are independently selected from polymerized vinyl aromatic hydrocarbon blocks and B is independently selected from an ethylene-alkylene block, from 1 to 30% by weight of a polyolefin based on the total weight of the composition, and from 1 to 25% by weight of a flame retardant plasticizer based on the total weight of the composition, said flame retardant plasticizer being a phosphate compound.

2. The composition of claim 1 wherein A and A' are independently selected from polymerized vinyl aromatic hydrocarbon blocks of 3,000 to 20,000 number average molecular weight.

3. The composition of claim 1 wherein B is independently selected from an ethylene-alkylene hydrogenated block copolymer of 25,000 to 150,000 number

|  | EXAMPLES | | | | | | | | | | |
|---|---|---|---|---|---|---|---|---|---|---|---|
|  | 1 | 2 | 3 | 4 | 5 | 6 | 7 | 8 | 9 | 10 | 11 |
| Ingredients | | | | | | | | | | | |
| PPE | 51 | 51 | 51 | 51 | 51 | 51 | 51 | 51 | 51 | 51 | 51 |
| Triblock/Diblock |  | 24[2] |  | 32[2] |  | 24[2] |  | 6[3] (83/17) | 12[3] (65/35) | 18[3] (48/52) | 24[4] (30/90) |
| Triblock | 24[1] |  | 32[1] |  | 24[1] |  | 24[1] |  |  |  |  |
| PE (GR-8320) | 8 | 8 |  |  | 8 | 8 | 8 | 8 | 8 | 8 | 8 |
| Phosphite U626 | 0.5 | 0.5 | 0.5 | 0.5 | 0.5 | 0.5 | 0.5 | 0.5 | 0.5 | 0.5 | 0.5 |
| 71B | 17 | 17 | 17 | 17 |  |  |  |  |  |  |  |
| RDP |  |  |  |  | 17 | 17 | 17 | 17 | 17 | 17 | 17 |
| Film @ 270° C. | | | | | | | | | | | |
| TY (KPSI)[5] |  |  |  |  |  | 1.9 |  |  |  |  |  |
| TS (KPSI) | 4.3 | 2.2 | 4.6 | 2.7 | 5.5 | 1.9 | 5.5 | 5.5 | 4.7 | 2.8 | 2.6 |
| TE (% elongation) | 231 | 269 | 96 | 324 | 170 | 197 | 175 | 174 | 154 | 90 | 58 |
| Film @ 230° C. | | | | | | | | | | | |
| TY (KPSI) | | | | | | | | | | | |
| TS (KPSI) | 5.9 | 3.1 | | | | | | | | | |
| TE (% elongation) | 91 | 154 | | | | | | | | | |

1. KRATON ® G-1652
2. KRATON ® G-1657
3. Blend of KRATON ® G-1652 and KRATON ® G-1726 - ratio of triblock to diblock as shown in each Example 8-11 in ( )
4. KRATON ® G-1726
5. KPSI - kilo ponds per, square inch As can be seen from the Examples, when employing the blend of elastomeric multiblock copolymers, namely the blend of triblock and diblock copolymers, significantly better flexibility and elongation are obtained, as compared to Examples using only the triblock average molecular weight.

4. The composition of claim 3 wherein the ethylene-alkylene block copolymer is independently selected from the group consisting of linear and branched ethylene-alkylene block copolymer.

5. The composition of claim 4 wherein the block copolymer B is ethylene-butylene having a number average molecular weight of 30,000 to 100,000.

6. The composition of claim 1 comprising, in addition to the polyphenylene ether resin and the elastomeric block copolymer, a flame retardant additive sufficient to render the composition flame retardant.

7. The composition of claim 6, further comprising a phenylsiloxane fluid having a viscosity of 400–600 centistokes.

8. The composition of claim 1, further comprising a phenylsiloxane fluid having a viscosity of 400 to 600 centistokes.

9. The composition of claim 1 wherein the elastomeric block copolymer consists essentially of in admixture 65% by weight of a styrene-(ethylene-butylene)-styrene triblock copolymer and, correspondingly, 35% by weight of a styrene-(ethylene-butylene) diblock copolymer said percentage by weight being based on the weight of the elastomeric blend, and further comprising in admixture therewith from 0.01% to 10% by weight of a phosphite based on the total weight of the thermoplastic resin composition.

10. The composition of claim 9 wherein the flame retardant plasticizer is resorcinol diphosphate.

11. The composition of claim 9 wherein the phosphite is bis (2,4-di-t-butylphenyl) pentaerythritol diphosphite.

12. The composition of claim 9 wherein the polyolefin is a linear low density polyethylene.

13. The composition of claim 9 wherein the flame retardant is resorcinol diphosphate, the phosphite is bis (2,4-di-t-butyl-phenyl) pentaerythritol diphosphite, and the polyolefin is a linear low density polythylene.

14. An electrical conductive article comprising an electrical conductor having a coating thereon wherein the coating comprises the composition of claim 13.

15. The composition of claim 9 wherein the triblock copolymer component is a styrene-(ethylene-butylene)-styrene copolymer having a average molecular weight of 80,000, and the diblock component is a styrene-(ethylene-butylene) block copolymer having an average molecular weight of 75,000.

16. An electrical conductive article comprising an electrical conductor having a coating thereon wherein the coating comprises the composition of claim 9.

17. An electrical conductive article comprising an electrical conductor having a coating thereon wherein the coating comprises the composition of claim 9 and wherein said coating covers an insulating layer covering the electrical conductive surface.

18. A formed article wherein the composition of the formed article comprises the composition of claim 9.

19. An electrical conductive article comprising an electrical conductor having a coating thereon wherein said coating comprises the composition of claim 1.

20. A formed article wherein the composition of the formed molded article comprises the composition of claim 1.

21. A flexible thermoplastic resin composition consisting essentially of in admixture of polyphenylene ether resin, from 10% by weight to 50% by weight of an elastomeric block copolymer based on the total weight of polyphenylene ether resin and elastomeric block copolymer wherein the elastomeric block copolymer comprises in admixture from 75% to 25% by weight of a triblock copolymer having a hydrogenated structure of A-B-A' and correspondingly from 25% by weight to 75% by weight of a diblock copolymer of A-B, wherein A and A' are independently selected from polymerized vinyl aromatic hydrocarbon blocks and B is independently selected from an ethylene-alkylene block, from 1 to 30% by weight of a polyolefin based on the total weight of the composition, and from 1 to 25% by weight of a flame retardant plasticizer based on the total weight of the composition, said flame retardant plasticizer being a phosphate compound.

22. The composition of claim 21 wherein the elastomeric block copolymer consists essentially of in admixture the triblock copolymer and the diblock copolymer.

23. A flexible polymer mixture consisting of a polyphenylene ether resin, a triblock copolymer having a hydrogenated structure of A-B-A' and a diblock copolymer having a hydrogenated structure of A-B, wherein A and A' are independently selected from polymerized vinyl aromatic hydrocarbon blocks and B is independently selected from an ethylene-alkylene block, a polyolefin, a phosphite, and a phosphate.

* * * * *